United States Patent
Miwa et al.

(10) Patent No.: US 6,219,598 B1
(45) Date of Patent: Apr. 17, 2001

(54) AUTOMOTIVE CONTROLLER MAINTAINING OPERATION OF CONTROLLED DEVICE WHEN A MICROCOMPUTER OVERRUNS AND CANNOT BE RESET

(75) Inventors: Toshimasa Miwa; Isao Yamamoto; Tetsuo Sasaki, all of Kanagawa; Masakazu Imai; Hiroyuki Kamishima, both of Yokohama, all of (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/022,031

(22) Filed: Feb. 11, 1998

(30) Foreign Application Priority Data

Feb. 12, 1997  (JP) .................................................... 9-027954

(51) Int. Cl.[7] ........................................................ G06F 7/00
(52) U.S. Cl. .................................. 701/36; 701/33; 701/35; 701/29; 340/458; 340/438
(58) Field of Search .................................. 701/36, 33, 35, 701/29, 34, 30; 340/438, 458

(56) References Cited

U.S. PATENT DOCUMENTS

| | | | |
|---|---|---|---|
| 4,641,041 | * | 2/1987 | Mattes et al. ........................ 340/438 |
| 5,038,134 | * | 8/1991 | Kondo et al. ........................ 340/438 |
| 5,479,347 | * | 12/1995 | Oguro et al. ............................. 701/35 |
| 5,525,959 | * | 6/1996 | Przybyla et al. ...................... 340/438 |
| 5,825,097 | * | 10/1998 | Saito et al. .......................... 307/10.1 |
| 5,916,290 | * | 6/1999 | Kiribayashi ............................. 701/45 |
| 5,917,405 | * | 6/1999 | Joao ..................................... 340/426 |

* cited by examiner

Primary Examiner—William A. Cuchlinski, Jr.
Assistant Examiner—Olga Hernandez
(74) Attorney, Agent, or Firm—McDermott, Will & Emery

(57) ABSTRACT

A control system keeps a controlled device operating even when a microcomputer of the system overruns during operation of the controlled device. The control system includes a microcomputer which outputs an operating signal to operate a vehicle-mounted device when the qualifications of operation of the device are met and which outputs a program run signal representing that a control program is being normally executed by the microcomputer and a sleep signal representative of a sleep condition/low power consumption condition of the microcomputer, a watch dog timer which, when the microcomputer fails to output the program run signal, resets the microcomputer and when the microcomputer outputs the sleep signal stops the resetting of the microcomputer, an auxiliary operating circuit which, with a key switch of a motor vehicle kept ON and the sleep signal output from the microcomputer, outputs an auxiliary operating signal of the device subject to meeting of operating qualifications of the device, and a drive circuit which drives the vehicle-mounted device when receiving the operating signal from either one or the microcomputer and the auxiliary operating circuit.

10 Claims, 5 Drawing Sheets

AUTOMOTIVE CONTROLLER MAINTAINING OPERATION OF CONTROLLED DEVICE WHEN A MICROCOMPUTER OVERRUNS AND CANNOT BE RESET

FIELD OF THE INVENTION

The present invention relates to controllers for controlling devices mounted on a motor vehicle.

BACKGROUND OF THE INVENTION

Heretofore, various vehicle-mounted devices have been put into practical use which are, for example, an auto-light system wherein head lamps and small lamps are automatically turned ON and OFF in accordance with how bright or dark it is outside of a vehicle, and a raindrop sensing type intermittent windshield wiper system wherein wipers are automatically operated in accordance with the quantity of raindrops.

In general, these vehicle-mounted devices are supervised by a microcomputer and controlled to exhibit various operation modes based on software practically applied to the computer.

As is known, in the microcomputer, control programs stored in a ROM are executed successively to control the vehicle-mounted devices. However, if there is a problem in executing a program, a malfunction known as computer overrun sometimes occurs in which the computer runs, but fails to complete a processing of the program.

In order to deal with such overrun problem of the computer, monitoring circuits, such as watch dog timer (hereinafter referred to as "WDT") and the like, heretofore have been used in order to take necessary action upon occurrence of the overrun.

Usually, a vehicle-mounted battery is used for powering the vehicle-mounted devices. In order to save battery power during the time when a key switch is kept OFF, the microcomputer is put into a sleep mode/low power consumption mode when the key switch is turned OFF.

FIG. 4 shows a controller which has been considered for use for controlling an automotive auto-light system.

A controller 1 of the auto-light system comprises a microcomputer 2, a ROM 3 and a transistor 4. In the microcomputer 2, a lamp ON/OFF operating program stored in the ROM 3 is executed so that upon requirement of light-ON, the transistor 4 is turned ON to connect a battery 5 to a lamp 6. Battery 5 also supplies power to operate controller 1.

Now, a situation wherein operation of the microcomputer 2 is monitored by a watch dog timer (WDT) 7 will be considered. At predetermined intervals, the microcomputer 2 outputs to the WDT 7 the P-signal. (PRUN signal) representing that the program is being normally executed. The WDT 7 monitors the P-signal from the microcomputer 2 and, upon finding something wrong, outputs the R-signal (RESET signal) to reset the microcomputer 2.

When an overrun occurs, it is impossible to predict what occurs first or is earlier, stopping of the P-signal or changing of the output signal from the microcomputer to an L-level. If the P-signal stops before changing of the output signal from the microcomputer to the L-level, the WDT 7 will reset the microcomputer before changing of the output signal from the microcomputer to the L-level, keeping the lamp 6 ON. Since the P-signal is outputted once a "time interval", it may take as long as the "time period" to detect stopping of the P-signal and the output signal from the microcomputer can change to the L-level before the stopping of the P-signal is detected. After stopping of the P-signal is detected, the WDT 7 resets the microcomputer, returning it to normal operation. However, despite this occurring, there is no practical problem since the time from the start of the overrun to the resetting of the microcomputer takes only several milliseconds. This time period is so short that the device, such as lamp 6, cannot follow the brief change of the output signal from the microcomputer and a driver of the motor vehicle would not recognize any change in the operation of lamp 6.

When a key switch 8 of the motor vehicle is turned OFF, the microcomputer 2 is put in the sleep mode/low power consumption mode to reduce power consumption and thereby save the power of the battery 5. When this occurs, the P-signal from the microcomputer 2 stops. However, upon sensing stopping of the P-signal, the WDT 7 tends to output the R-signal to reset the microcomputer 2, misconstruing the stop as an abnormality of the computer.

In order to avoid such drawback, the microcomputer 2 outputs the S-signal (SLEEP signal) to the WDT 7 when put into the sleep mode/low power consumption mode. Upon receiving the S-signal, the WDT 7 stops outputting the R-signal, judging that the microcomputer has been put into the sleep mode/low power consumption mode. Thus, the S-signal is a reset prevent signal since the microcomputer 2 outputting the S-signal to the WDT 7, prevents the WDT 7 from resetting the microcomputer 2.

However, it is very difficult to foresee the time and condition when such an overrun of the microcomputer occurs. Assuming that the microcomputer 2 overruns with the lamp 6 kept ON and also outputs the S-signal even though not in the sleep mode/low power consumption mode, the WDT 7 does not output the R-signal because of receiving the S-signal irrespective of the fact it is capable of sensing the abnormality of the microcomputer 2 by sensing lack of the P-signal. As a result, the microcomputer 2 is not reset and thus, the lamp 6 is turned OFF. If the S-signal is not issued at the beginning of the overrun, the WDT 7 can sense the abnormality of the microcomputer 2 by sensing the lack of the P-signal, and thus it can avoid erroneously turning OFF of the lamp 6 by outputting the R-signal for resetting the microcomputer 2.

In the example of FIG. 4, the description is directed to an automotive controller for controlling an auto-light system. Similar drawbacks are possessed also by an automotive controller for controlling a raindrop sensing type intermittent windshield wiper system. That is, when an overrun occurs in the microcomputer of an automotive controller having a watch dog timer for monitoring occurrence of an abnormality of the microcomputer which has a sleep mode/low power consumption mode, making the microcomputer initially issue a Sleep signal, the WDT receiving this Sleep signal is forced to stop resetting of the microcomputer. In this case, resetting of the microcomputer is not carried out, and thus, due to the overrun, output from the microcomputer to a controlled device is varied, thereby stopping operation of the controlled device.

In order to avoid this drawback, a measure may be considered that, when the Sleep signal is outputted upon turning of the key switch ON, the microcomputer is forced to be reset judging that the microcomputer has overrun. However, this type operation may be repeatedly made when overrun of the microcomputer actually occurs, and thus, the above-mentioned measure lacks reliability and stability.

SUMMARY OF THE INVENTION

It is an object of the present invention is to provide a reliable and stable automotive controller which can keep a controlled device operating even when a microcomputer overruns during operation of the controlled device.

A control system in accordance with the present invention comprises a microcomputer which outputs an operating signal to operate a vehicle-mounted device when the qualifications of operation of the device are met and which outputs a program run representing that a control program is being normally executed by the microcomputer and a sleep signal representative of a sleep condition/low power consumption condition of the microcomputer, a watch dog timer which, when the microcomputer fails to output the program run signal, resets the microcomputer and when the microcomputer outputs the sleep signal, stops the resetting of the microcomputer, an auxiliary operating circuit which, when a key switch of a motor vehicle is kept ON and the sleep signal is output from the microcomputer, outputs an operating signal of the device subject to meeting of operating qualifications of the device, and a drive circuit which drives the vehicle-mounted device when receiving the operating signal from either one of the microcomputer and the auxiliary operating circuit.

DESCRIPTION OF THE PREFERRED EMBODIMENTS

Figure 1:
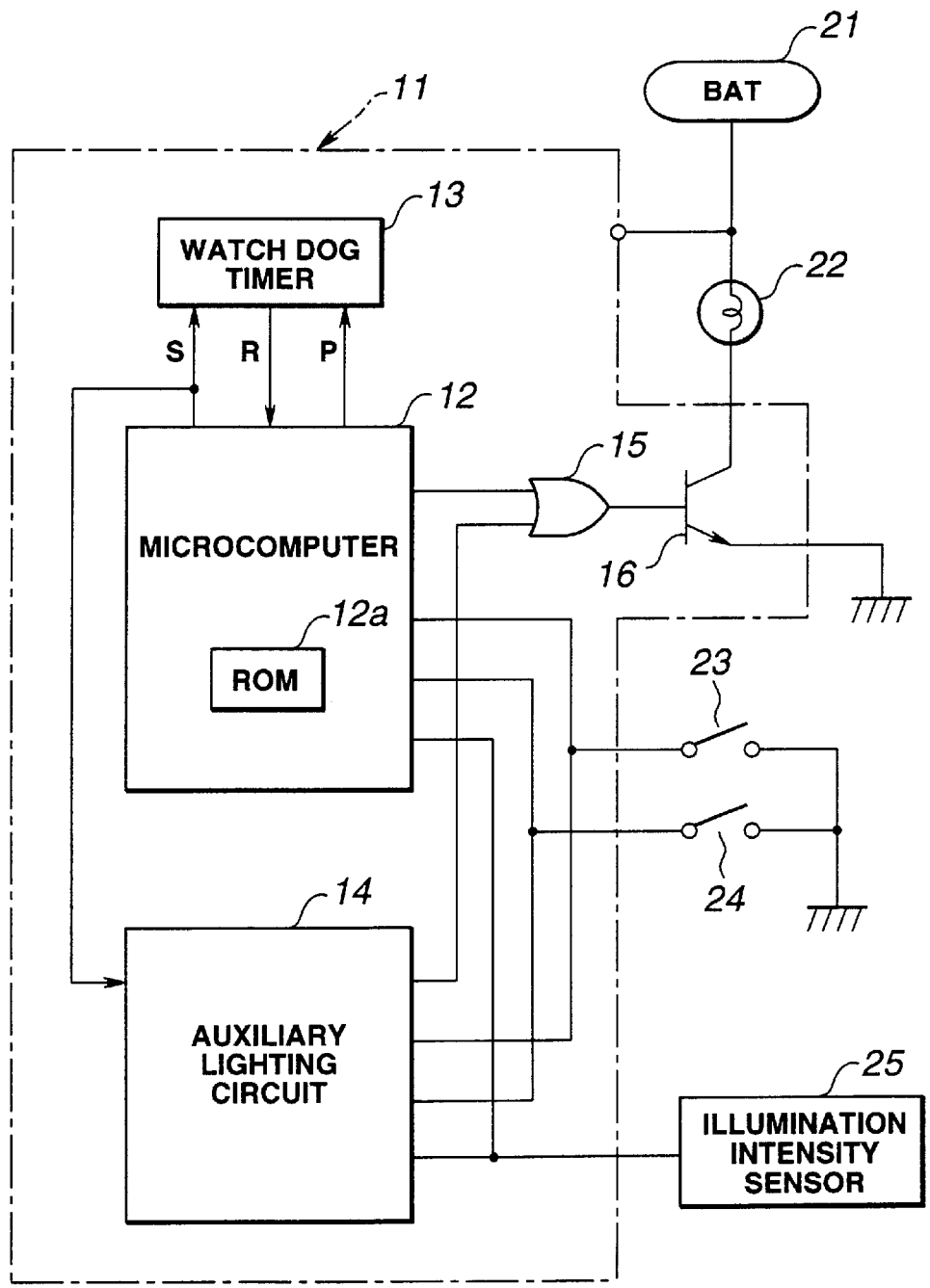
FIG. 1 is a block diagram showing a first embodiment of the Invention.

FIG. 1 shows a first embodiment of the invention wherein an auto-light system automatically turns head lamps ON and OFF in accordance with how light or dark it is outside of a vehicle.

A controller 11 of the auto-light system comprises a microcomputer 12, a watch dog timer (WDT) 13, an auxiliary lighting circuit 14, an OR element 15 and a transistor 16. In the microcomputer 12, a lamp ON/OFF control program stored in a ROM 12a is executed so that upon requirement of light-ON, the transistor 16 is turned ON to connect a battery 21 to a lamp 22 for lighting the same. To the controller 11, there are connected a key switch 23 of a motor vehicle, an auto-light switch 24 and an illumination intensity sensor 25. When both the key switch 23 and the auto-light switch 24 are turned ON, the microcomputer 12 automatically carries out the ON/OFF operation of the lamp 22 based on the amount of light detected by the illumination intensity sensor 25. Since details of automatic ON/OFF control for a lamp are known, description of the same will be omitted. The lamp 22 is a headlamp, small lamp or the like.

The WDT 13 monitors the P-signal (PRUN signal) outputted from the microcomputer 12 at predetermined intervals, and upon finding something wrong, outputs the R-signal (RESET signal) to reset the microcomputer 12. The controller 11 has a sleep mode/low power consumption mode set therein, so that when the key switch 23 is turned OFF, the microcomputer 12 outputs the S-signal (SLEEP signal) to the WDT 13 when entering the sleep mode/low power consumption mode. When receiving the S-signal from the microcomputer 12, the WDT 13 does not consider the computer to be in trouble even if it fails to receive the P-signal and the WDT does not issue the R-signal.

Figure 1A:
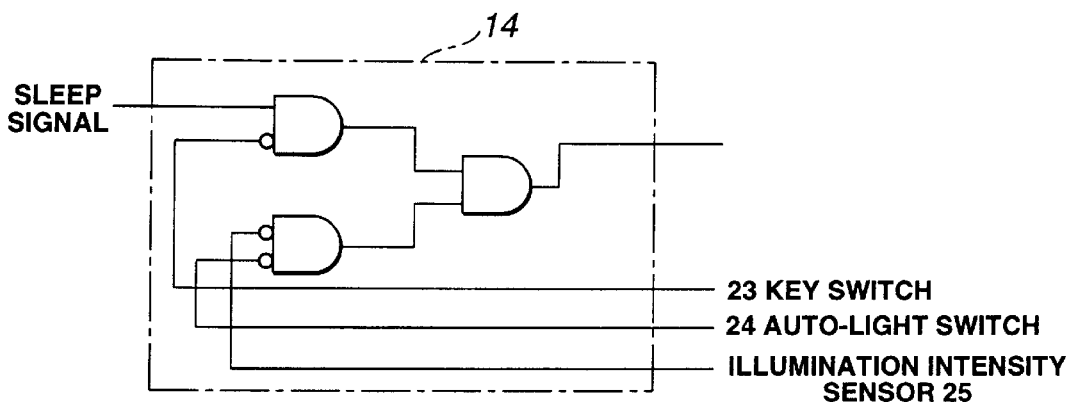
FIG. 1A is a diagram of a wired logic for the auxiliary lighting circuit of FIG. 1.

To the auxiliary lighting circuit 14, there is inputted the S-signal from the microcomputer 12, and connected thereto are the key switch 23, the auto-light switch 24 and the illumination intensity sensor 25. The auxiliary lighting circuit 14 is structured by wired logic, so that when the S-signal (SLEEP signal), the key switch ON signal, the auto-light switch ON signal and the illumination intensity signal, denoting illumination intensity lower than a predetermined value, are simultaneously received, the auxiliary lighting circuit 14 outputs a lamp lighting signal to OR element 15, thereby lighting the lamp 22 via transistor 16 irrespective of the condition of an lamp ON/OFF operating signal output by the microcomputer 12. An example of the wired logic for the auxiliary lighting circuit 14 which will perform this function is shown in FIG. 1A.

Operation of this first embodiment carried out when the microcomputer 12 encounters an overrun will be described in the following.

There are two types of overrun conditions of the microcomputer 12, one being a type wherein the S-signal is outputted at the beginning of the overrun and the other being a type wherein the Signal is not outputted at the beginning of the overrun. In the latter type wherein the S-signal is not issued at the beginning of the overrun, the WDT 13 detects an abnormality by sensing lack of the P-signal from the microcomputer 12, and outputs the R-signal to reset the microcomputer 12. Thus, in this type overrun condition, turning OFF of the lighting lamp 22 does not occur.

When the microcomputer 12 receives the key switch ON signal, the auto-light ON signal and the illumination intensity signal denoting illumination intensity lower than the predetermined value to output a lamp ON/OFF operating signal at the ON condition to light the lamp 22, and encounters the former type overrun wherein the S-signal is outputted at the beginning of the overrun, the WDT 13 does not output the R-signal because of receiving the S-signal irrespective of the fact it is capable of sensing the abnormality of the microcomputer 12 by sensing lack of the P-signal. Accordingly, the microcomputer 12 is not reset and thus, the lamp 22 would turn OFF via the transistor 16 by a change of the lamp ON/OFF operating signal from the overrunning microcomputer 12 to OR element 15 from the ON condition to the OFF condition.

However, under this condition, the S-signal is inputted also to the auxiliary lighting circuit 14 which simultaneously receives also the key switch ON signal, the auto-light ON signal and the illumination intensity signal denoting illumination intensity lower than the predetermined value. Thus, the qualifications of lamp lighting are met which results in outputting of an auxiliary lamp ON/OFF operating signal at the ON condition from the auxiliary lighting circuit 14 to OR element 15 to keep transistor 16 ON. Consequently, even when the microcomputer 12 fails to output the lamp ON/OFF operating signal at the ON level due to its overrun, the auxiliary lamp ON/OFF operating signal at the ON condition is issued from the auxiliary lighting circuit 14 to keep the transistor 16 ON, and thus lighting of the lamp 22 is maintained.

As is described hereinabove, when receiving the Sleep signal from the microcomputer, key switch ON signal, auto-light ON signal and illumination intensity signal denoting illumination intensity lower than the predetermined value, the auxiliary lighting circuit outputs the auxiliary lamp ON/OFF operating signal at the ON condition substituting for the lamp ON/OFF operating signal at the ON condition from the microcomputer. Thus, with the key switch kept ON and the Sleep signal issued from the microcomputer, the lamp is lighted subject to meeting of the lamp lighting qualifications provided by the auto-light switch and the amount of light outside of the vehicle. Accordingly, even when the microcomputer is subjected to overrun of a type wherein the Sleep signal is issued at the beginning of the overrun during lighting of the lamp, the lamp is not erroneously turned OFF.

Figure 2A:
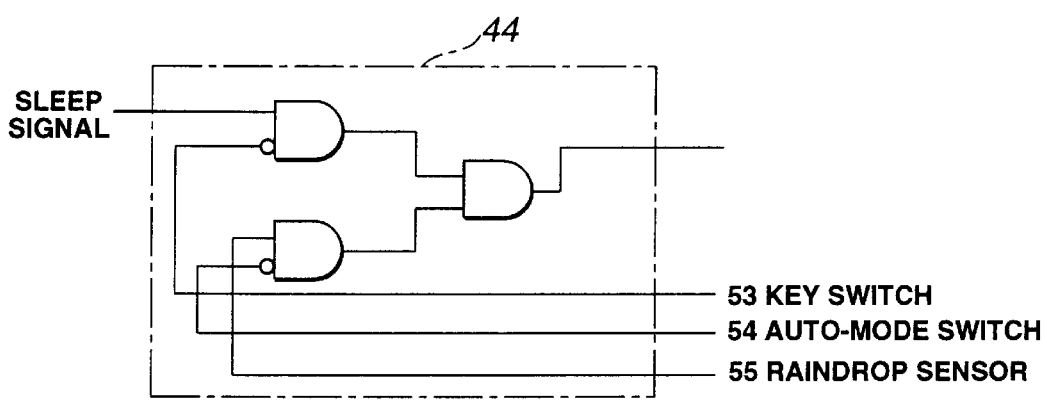
FIG. 2A is a diagram of a wired logic for the auxiliary drive circuit of FIG. 2.
Figure 2:
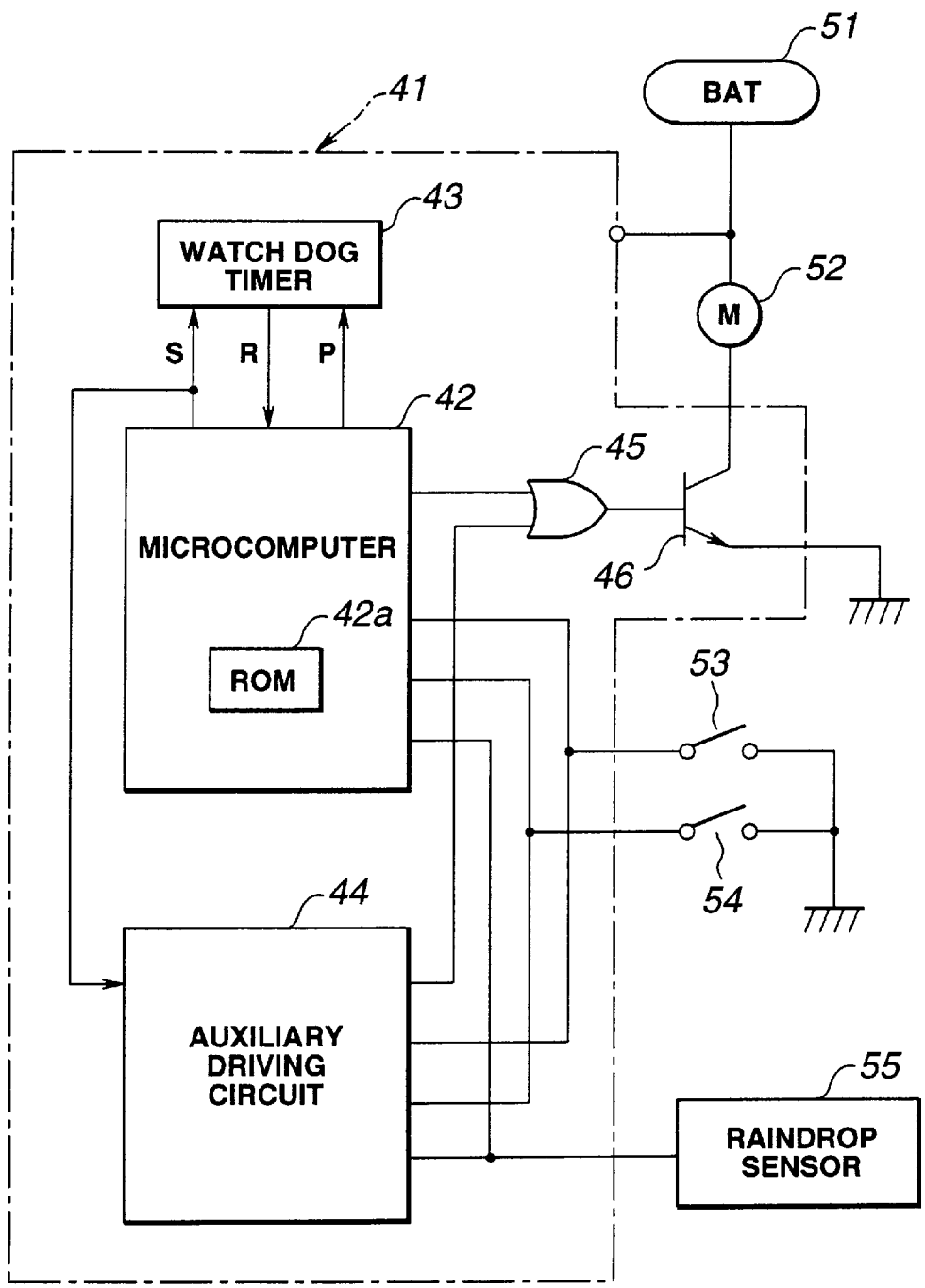
FIG. 2 is a block diagram showing a second embodiment of the Invention.

FIG. 2 shows a second embodiment of the invention wherein a raindrop sensing type automatic intermittent windshield wiper system is automatically operated in accordance with the quantity of raindrops.

A controller 41 of the raindrop sensing type automatic intermittent windshield wiper system comprises a microcomputer 42, a watch dog timer (WDT) 43, an auxiliary drive circuit 44, an OR element 45 and a transistor 46. In the microcomputer 42, a wiper control program stored in a ROM 42a is executed, so that upon requirement of wiper-ON, the wiper operating signal output from the microcomputer 42 turns the transistor 46 ON via the OR element 45 to connect a battery 51 to a wiper motor 52 to operate the same. To the controller 41, there are connected a key switch 53 of a motor vehicle, an auto-wiper switch 54 and a raindrop sensor 55. When both the key switch 53 and the auto-wiper switch 54 are turned ON, the microcomputer 42 automatically carries out an intermittent drive control of the wiper motor 52 based on the quantity of raindrops detected by the raindrop sensor 55. Since the details of an automatic control for a wiper are known, description of the same will be omitted.

The WDT 43 monitors the P-signal (PRUN signal) outputted from the microcomputer 42 at predetermined intervals, and upon finding something wrong, outputs the R-signal (RESET signal) to reset the microcomputer 42. The controller 41 has a sleep mode/low power consumption mode set therein, so that when the key switch 53 is turned OFF, the microcomputer 42 outputs the S-signal (SLEEP signal) to the WDT 43 when entering the sleep mode/low power consumption mode. When receiving the S-signal from the microcomputer 42, the WDT 43 does not consider the computer to be in trouble even if it fails to receive the P-signal and the WDT does not issue R-signal.

To the auxiliary drive circuit 44, there is inputted the S-signal from the microcomputer 42, and connected thereto are the key switch 53, the auto-wiper switch 54 and the raindrop sensor 55. The auxiliary drive circuit 44 comprises a wired logic, so that when the S-signal (SLEEP signal), the key switch ON signal, the auto-wiper switch ON signal and the raindrop signal denoting a quantity of raindrops higher than a predetermined value are simultaneously received, the auxiliary drive circuit 44 outputs an auxiliary wiper operating signal to turn the transistor 46 ON through the OR element 45 thereby operating the wiper motor 52 irrespective of the wiper operating signal output by the microcomputer 42. An example of the wired logic for the auxiliary drive circuit 44 which will perform this function is shown in FIG. 2A.

Operation of this second embodiment carried out when the microcomputer 42 encounters an overrun will be described in the following.

When, during operation of the wiper motor 52, the microcomputer 42 encounters an overrun of a type wherein the Signal is not issued at the beginning of the overrun, the WDT 43 detects an abnormality by sensing lack of the P-signal from the microcomputer 42, and outputs the R-signal to reset the microcomputer 42. Thus, in this type overrun condition, operation of the wiper motor 52 does not stop.

When, the microcomputer 42 receives the key switch ON signal, auto-wiper ON signal and raindrop signal denoting a quantity of raindrops higher than the predetermined value to output the wiper operating signal to operate the wiper motor 52, and encounters an overrun of a type wherein the S-signal is outputted at the beginning of the overrun, the WDT 43 does not output the R-signal because of receiving the S-signal irrespective of the fact it is capable of sensing the abnormality of the microcomputer 42 by sensing lack of the P-signal. Accordingly, the microcomputer 42 is not reset and thus, the wiper motor 42 is turned OFF by a change of the wiper operating signal from the overrunning microcomputer 42.

However, under this condition, the S-signal is inputted also to the auxiliary drive circuit 44 which simultaneously receives also the key switch ON signal, the auto-wiper switch ON signal and the raindrop signal denoting a quantity of raindrops higher than the predetermined value. Thus, the qualifications of operation of the wiper are met which results in outputting of an auxiliary wiper operating signal from the auxiliary drive circuit 44. As a result, even when the microcomputer 42 fails to output a wiper operating signal due to an overrun, the auxiliary wiper operating signal is issued from the auxiliary drive circuit 44 to keep the transistor 46 ON, and thus operation of the wiper motor 42 is maintained. During this operation, the wiper motor 52 is forced to make an intermittent operation in accordance with the quantity of raindrops detected by the raindrop sensor 55.

As is described hereinabove, when receiving the Sleep signal from the microcomputer, the key switch ON signal, the auto-wiper ON signal and the raindrop signal denoting a quantity of raindrops higher than the predetermined value, the auxiliary drive circuit outputs the auxiliary wiper operating signal, replacing the wiper operating signal from the microcomputer. Thus, with the key switch kept ON and the Sleep signal issued from the microcomputer, the wiper is operated subject to meeting of the wiper operating qualifications provided by the auto-wiper switch and the quantity of raindrops. Accordingly, even when the microcomputer is subjected to overrun of a type wherein the Sleep signal is issued at the beginning of the overrun during operation of the wiper, the wiper does not stop.

Figure 3A:
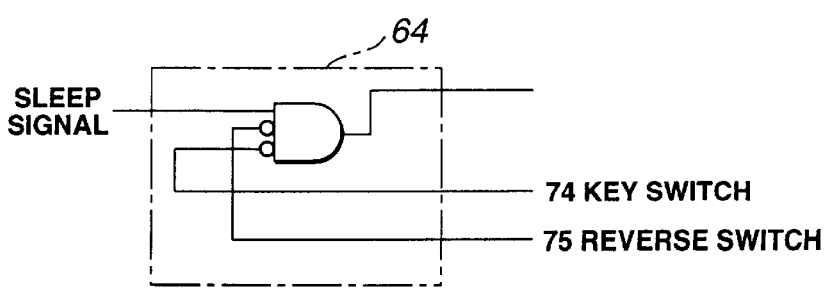
FIG. 3A is a diagram of a wired logic for the auxiliary drive circuit of FIG. 3.
Figure 3:
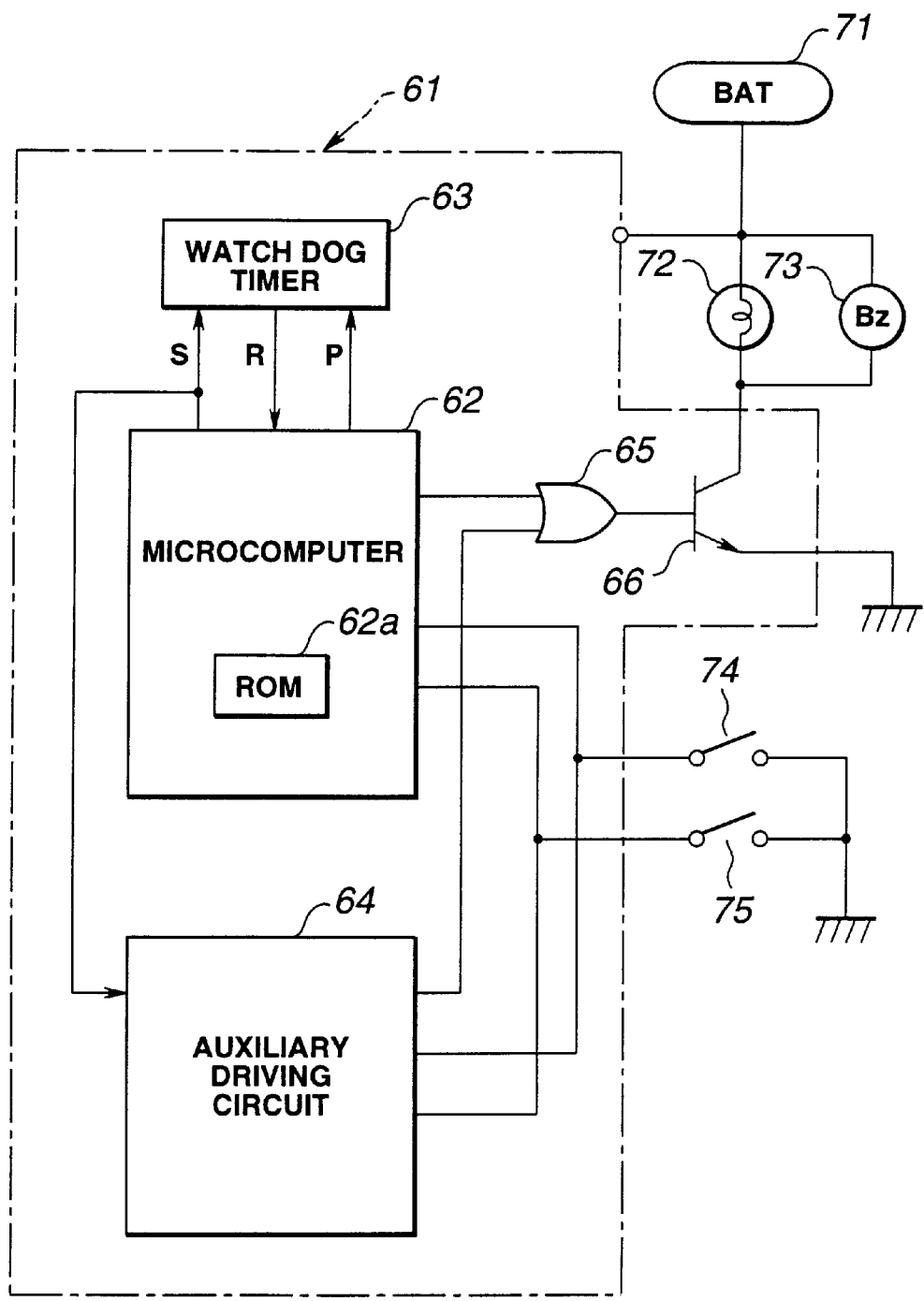
FIG. 3 is a block diagram showing a third embodiment of the Invention.
Figure 4:
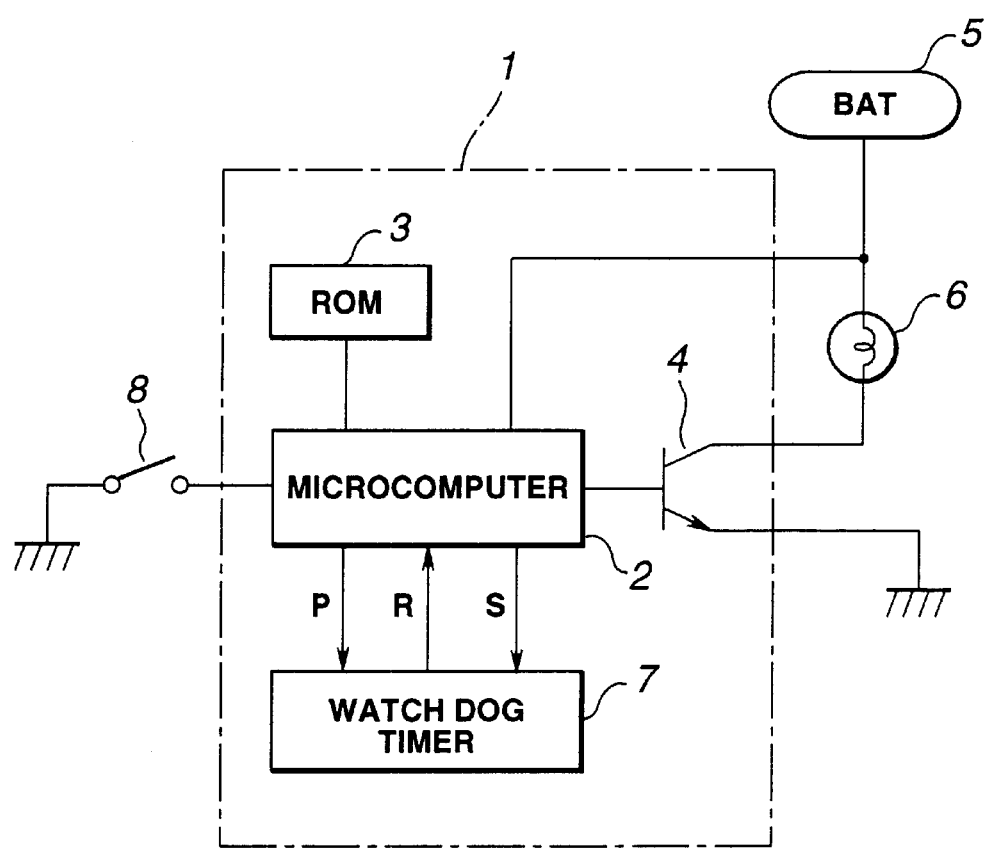
FIG. 4 is a block diagram showing a controller considered for controlling an automotive auto-light system.

FIG. 3 shows a third embodiment of the invention wherein an automotive control device lights a reverse lamp and operates a buzzer when an associated motor vehicle runs backward.

A controller 61 of the third embodiment comprises a microcomputer 62, a watch dog timer (WDT) 63, an auxiliary drive circuit 64, an OR element 65 and a transistor 66. In the microcomputer 62, a reverse run control program stored in a ROM 62a is executed, so that upon requirement of reverse run, the microcomputer 62 outputs an operating signal to turn ON transistor 66 through the OR element 65 to connect a battery 71 to both a reverse lamp 72 and a reverse buzzer 73 to operate the same. To the controller 61, there are connected a key switch 74 and a reverse switch 75 of a motor vehicle. When both the key switch 74 and the reverse switch 75 are turned ON, the microcomputer 62 outputs the operating signal to turn the reverse lamp 72 ON and at the same time operates the buzzer 73.

The WDT 63 monitors the P-signal (PRUN signal) outputted from the microcomputer 62 at predetermined intervals, and upon finding something wrong, outputs the R-signal (RESET signal) to reset the microcomputer 62. The controller 61 has a sleep mode/low power consumption mode set therein, so that when the key switch 74 is turned OFF, the microcomputer 62 outputs the S-signal (SLEEP signal) to the WDT 63 when entering the sleep mode/low power consumption mode. When receiving the S-signal from the microcomputer 62, the WDT 63 does not judge that the computer to be trouble even if it fails to receive the P-signal and the WDT does not issue R-signal.

To the auxiliary drive circuit 64, there is inputted the S-signal from the microcomputer 62, and there are connected the key switch 74 and the reverse switch 75. The auxiliary drive circuit 64 comprises a wired logic, so that when the S-signal (SLEEP signal), the key switch ON signal and the reverse switch ON signal are simultaneously received, the auxiliary drive circuit 64 outputs an auxiliary operating signal to turn the transistor 66 ON through the OR element 65 thereby operating both the reverse lamp and the reverse buzzer irrespective of the condition of the operating signal output by the microcomputer 62. An example of the wired logic for the auxiliary drive circuit 64 which will perform this function is shown in FIG. 3A.

Operation of this third embodiment carried out when the microcomputer 62 encounters an overrun will be described in the following.

When, during the operation of the reverse lamp 72 and reverse buzzer 73, the microcomputer 62 encounters an overrun of a type wherein the S-signal is not issued at the beginning of the overrun, the WDT 63 detects an abnormality by sensing lack of the P-signal from the microcomputer 62, and outputs the R-signal to reset the microcomputer 62. Thus, in this type overrun condition, the reverse lamp 72 and the reverse buzzer 73 are not turned OFF.

When the microcomputer 62, receives the key switch ON signal and the reverse switch ON signal to output the operating signal to operate both the reverse lamp 72 and the reverse buzzer 73, and encounters an overrun of a type wherein the S-signal is outputted at the beginning of the overrun, the WDT 63 does not output the R-signal because of receiving the S-signal irrespective of the fact it is capable of sensing the abnormality of the computer 62 by sensing lack of the P-signal. Accordingly, the microcomputer 62 is not reset and thus, both the reverse lamp 72 and the reverse buzzer 73 are forced to stop their operation by a change of the operating signal from the overrunning microcomputer 62.

However, under this condition, the S-signal is inputted also to the auxiliary drive circuit 64 which simultaneously receives also the key switch ON signal and the reverse switch ON signal. Thus, the qualifications of operation of the reverse lamp and buzzer are met which results in outputting an auxiliary operating signal from the auxiliary drive circuit 64. As a result, even when the microcomputer 62 fails to output the operating signal due to an overrun, the auxiliary operating signal is issued from the auxiliary drive circuit 64 to keep the transistor 66 ON, and thus the reverse lamp 72 and the reverse buzzer 73 are kept ON.

As is described hereinabove, when receiving the Sleep signal from the microcomputer, the key switch ON signal and the reverse switch ON signal, the auxiliary drive circuit outputs the auxiliary operating signal, replacing the operating signal from the microcomputer, thereby enabling operation of the reverse lamp and reverse buzzer. Thus, with the key switch kept ON and the Sleep signal issued from the microcomputer, the reverse lamp and reverse buzzer are operated subject to meeting of the operating qualifications of them. Accordingly, even when the microcomputer is subjected to overrun of a type wherein the Sleep signal is issued at the beginning of the overrun during operation of the reverse lamp and reverse buzzer, the reverse lamp and reverse buzzer are kept ON.

In the above-mentioned embodiments, the lamp 22, the wiper motor 52, the reverse lamp 72 and the reverse buzzer 73 constitute the vehicle-mounted devices respectively. The microcomputers 12, 42 and 62 define respective microcomputers, the watch dog timers 13, 43 and 63 define respective watch dog timers, and the auxiliary lighting circuit 14 and the auxiliary drive circuits 44 and 64 define respective auxiliary drive circuits. The OR elements 15, 45 and 65 and the transistors 16, 46 and 66 define respective drive circuits, and the raindrop sensor 55 defines a raindrop detector.

The present invention is applicable to motor vehicles including vehicles powered by an internal combustion engine and electric vehicles.

Although the description on the above-mentioned embodiments is directed to an automotive controller having a watch dog timer, the present invention can be applied to another, type automotive controller having no watch dog timer.

What is claimed is:

1. A control system for a device used on a vehicle, comprising:
   at least one circuit element outputting a signal corresponding to a condition used to control operation of the device;
   a first controller receiving the signal from said at least one circuit element and outputting a first control signal to operate the device, the first controller outputting also a reset prevent signal when the first controller cannot be reset;
   a monitoring circuit configured to detect occurrence of an abnormality in operation of the first controller which will halt outputting of the first control signal, and to reset the first controller when the abnormality is detected and the reset prevent signal is not output by the first controller to maintain outputting of the first control signal; and
   a second controller configured to output a second control signal to operate the device in response to receipt of the signal from the at least one circuit element and the reset prevent signal from the first controller.

2. The control system according to claim 1, wherein
   the first controller outputs an operation indicating signal when operating normally, and
   the monitoring circuit detects that the abnormality occurs in the first controller when the operation indicating signal is not output from the first controller.

3. The control system as defined in claim 1, wherein
   the first controller comprises a microcomputer outputting an operation indicating signal when operating normally, the abnormality is an overrun by the microcomputer during which the operation indicating signal is not output by the microcomputer, the reset prevent signal is a low-power-consumption mode/sleep mode signal, the monitoring circuit is a watch dog timer which monitors output of the operation indicating signal from the microcomputer and outputs a resetting signal to the microcomputer when absence of both the operation indicating signal and the low-power-consumption mode/sleep mode signals is detected, and the second controller is a wired logic, not subject to overrun as is the microcomputer.

4. The control system according to claim 1, wherein under normal condition of the first controller, said first controller outputs the first control signal in a predetermined cycle, and said monitoring circuit monitors said first control signal and judges the abnormality in operation of the first controller when failing to receive said first control signal for a predetermined time.

5. The control system as defined in claim 1, wherein the at least one circuit element includes a key switch, and the first and the second controllers activate the device when the key switch is closed.

6. The control system as defined in claim 5, wherein the device comprises a lamp, the at least one circuit element further includes a light switch disposed inside the vehicle and a light intensity sensor to measure a light intensity around the vehicle, the first controller outputs the first control signal to turn the lamp on when the key switch is on, the light switch is on, and the light intensity sensor detects the light intensity less than a predetermined level, and the second controller outputs the second control signal to turn the lamp on when the key switch is on, the light switch is on, the light intensity sensor detects the light intensity less than the predetermined level, and the reset prevent signal is received from the first controller.

7. The control system as defined in claim 5, wherein the device comprises a wiper motor, the at least one circuit element further includes a wiper switch disposed inside the vehicle and a rainfall sensor to measure quantity of rainfall around the vehicle, the first controller outputs the first control signal to operate the wiper motor when the key switch is on, the wiper switch is on, and the rainfall sensor detects the rainfall quantity more than a predetermined level, and the second controller outputs the second control signal to operate the wiper motor when the key switch is on, the wiper switch is on, the rainfall sensor detects the rainfall quantity more than a predetermined level, and the reset prevent signal is received from the first controller.

8. The control system as defined in claim 5, wherein the device is constituted by a reverse lamp and buzzer for indicating the vehicle is going backward, the at least one circuit element further includes a reverse switch closed when a transmission is shifted to a reverse position, the first controller outputs the first control signal to turn on the reverse lamp and buzzer when the key switch is on and the reverse switch is on, and the second controller outputs the second control signal to turn on the reverse lamp and buzzer when the key switch is on, the reverse switch is on and the reset prevent signal is received from the first controller.

9. A method for controlling operation of a device used on a vehicle utilizing a first controller capable of being reset when an abnormality in operation of the first controller occurs, comprising the steps of:

detecting a condition used to control the operation of the device;

outputting a first control signal from the first controller to control operation of the device according to the detected condition;

detecting (i) occurrence of an abnormality in operation of the first controller which will improperly halt outputting of the first control signal and (ii) absence of a reset prevent signal output from the first controller;

resetting the first controller to maintain outputting of the first control signal when both the abnormality and absence of the reset prevent signal are detected;

providing the detected condition and reset prevent signal to a second controller; and outputting a second control signal from the second controller to operate the device according to the detected condition when the first controller cannot be reset due to output of the reset prevent signal from the first controller.

10. A control system for controlling operation of a device used on a vehicle, comprising:

at least one means for providing a signal corresponding to a condition for operation of the device;

a first means for outputting (i) a first control signal for controlling the ON and OFF operations of the device in response to the signal from the at least one means, (ii) an operating condition signal indicative of an operation condition of the first means, and (iii) a reset prevent signal indicating that the first means cannot be reset;

means, responsive to the operating condition signal indicating an abnormality in operation of the first means which will improperly change the device from the ON operation to the OFF operation, and absence of the reset prevent signal, for resetting the first means to prevent improper changing of the device from the ON operation to the OFF operation; and a second means for outputting a second control signal to control the ON operation of the device in response to the signal from the at least one means and output of the reset prevent signal from the first means.

* * * * *